(12) United States Patent
Jung et al.

(10) Patent No.: US 8,473,803 B2
(45) Date of Patent: Jun. 25, 2013

(54) APPARATUS AND METHOD FOR GENERATING ARQ FEEDBACK MESSAGE IN WIRELESS COMMUNICATION SYSTEM

(75) Inventors: Hyeun-Mok Jung, Suwon-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 12/915,749

(22) Filed: Oct. 29, 2010

(65) Prior Publication Data

US 2011/0107168 A1 May 5, 2011

(30) Foreign Application Priority Data

Oct. 30, 2009 (KR) .................. 10-2009-0104162
Nov. 5, 2009 (KR) .................. 10-2009-0106678
Nov. 18, 2009 (KR) .................. 10-2009-0111700

(51) Int. Cl.
*H04L 1/18* (2006.01)
(52) U.S. Cl.
USPC ........................................ 714/749; 714/750
(58) Field of Classification Search
USPC .................................. 714/749, 750
See application file for complete search history.

(56) References Cited

U.S. PATENT DOCUMENTS

| | | | | |
|---|---|---|---|---|
| 8,036,101 B2 * | 10/2011 | Kim et al. | ...... | 370/216 |
| 2002/0093937 A1 * | 7/2002 | Kim et al. | ...... | 370/349 |
| 2004/0213184 A1 | 10/2004 | Hu et al. | | |
| 2010/0005358 A1 * | 1/2010 | Lim et al. | ...... | 714/749 |
| 2010/0011273 A1 * | 1/2010 | Parolari | ...... | 714/749 |
| 2010/0037112 A1 * | 2/2010 | Graumann | ...... | 714/748 |
| 2010/0050041 A1 * | 2/2010 | Chang et al. | ...... | 714/750 |
| 2010/0098185 A1 * | 4/2010 | Miyazaki | ...... | 375/267 |
| 2011/0107168 A1 * | 5/2011 | Jung et al. | ...... | 714/748 |
| 2011/0161768 A1 * | 6/2011 | Chang et al. | ...... | 714/749 |

FOREIGN PATENT DOCUMENTS

| | | |
|---|---|---|
| EP | 0 635 952 A1 | 1/1995 |
| KR | 10-2009-0098750 A | 9/2009 |
| WO | 00/08796 A1 | 2/2000 |

* cited by examiner

*Primary Examiner* — Joshua Lohn
(74) *Attorney, Agent, or Firm* — Jefferson IP Law, LLP

(57) ABSTRACT

An apparatus and a method for generating an Automatic Repeat reQuest (ARQ) feedback message in a wireless communication system are provided. The method includes generating first feedback information of at least one ARQ block, determining whether any ARQ blocks include at least one successfully received ARQ sub-block, when the at least one erroneous ARQ block includes at least one successfully received ARQ sub-block, adding second feedback information of the ARQ sub-blocks to the first feedback information of the ARQ blocks using a field indicating whether the second feedback information is added and a field indicating the erroneous ARQ blocks including the at least one successfully received ARQ sub-block, and sending the first feedback information with the second feedback information added, to the transmitting stage.

20 Claims, 6 Drawing Sheets

APPARATUS AND METHOD FOR GENERATING ARQ FEEDBACK MESSAGE IN WIRELESS COMMUNICATION SYSTEM

PRIORITY

The present application claims the benefit under 35 U.S.C. §119(a) to a Korean patent application filed in the Korean Intellectual Property Office on Oct. 30, 2009, and assigned Serial No. 10-2009-0104162, a Korean patent application filed in the Korean Intellectual Property Office on Nov. 5, 2009, and assigned Serial No. 10-2009-0106678, a Korean patent application filed in the Korean Intellectual Property Office on Nov. 18, 2009, and assigned Serial No. 10-2009-0111700, the entire disclosures of each of which are hereby incorporated by reference.

BACKGROUND OF THE INVENTION

1. Field of the Invention

The present invention relates to an apparatus and a method for Automatic Repeat reQuest (ARQ) in a wireless communication system. More particularly, the present invention relates to an apparatus and a method for generating an ARQ feedback message in a wireless communication system.

2. Description of the Related Art

Wireless communication systems are subject to data error according to the channel state of a radio resource carrying the data. To raise transmission reliability, the wireless communication systems generally control and recover the data error using an Automatic Repeat reQuest (ARQ) scheme.

Using the ARQ scheme, a receiving stage informs a transmitter stage of reception success or failure of an ARQ block received from the transmitting stage. For example, when the ARQ block received from the transmitting stage has no error, the receiving stage sends ACKnowledge (ACK) information to the transmitting stage. When the ARQ block received from the transmitting stage is erroneous, the receiving stage sends Negative ACK (NACK) information to the transmitting stage. A series of operations of the receiving stage informing the transmitting stage of success or failure in receiving the ARQ block is referred to as ARQ feedback. The receiving stage can carry out the ARQ feedback using a cumulative ACK scheme and a selective ACK scheme. Using the cumulative ACK scheme, the receiving stage transmits to the transmitting stage a sequence number of the last ARQ block of the ARQ blocks successfully received in succession. Using the selective ACK scheme, the receiving stage generates a bitmap indicating the reception success or failure of the ARQ block received from the transmitting stage and sends the bitmap to the transmitting stage.

When the ARQ block is given a variable length, the transmitting stage can divide the ARQ block into a plurality of ARQ sub-blocks and retransmit the ARQ sub-blocks to the receiving stage. In this case, the receiving stage needs to send ARQ feedback information of the ARQ block and ARQ feedback information of the ARQ sub-blocks to the transmitting stage. Accordingly, resources of the receiving stage for delivering the ARQ feedback information increase. When the transmitting stage generates the variable-length ARQ block, what is needed is a method for the receiving stage to efficiently transmit the ARQ feedback information of the ARQ block and the ARQ sub-block.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for generating an Automatic Repeat reQuest (ARQ) message at a receiving stage of a wireless communication system.

Another aspect of the present invention is to provide an apparatus and a method for generating an ARQ feedback message using a cumulative ACK scheme and a selective ACK scheme at a receiving stage of a wireless communication system.

Another aspect of the present invention is to provide an apparatus and a method for generating an ARQ feedback message for ARQ sub-blocks in a wireless communication system.

Another aspect of the present invention is to provide an apparatus and a method for reducing overhead of an ARQ feedback message for an ARQ sub-block at a receiving stage of a wireless communication system.

A further aspect of the present invention is to provide an apparatus and a method for generating an ARQ feedback message including ARQ feedback information of an ARQ block and ARQ sub-blocks at a receiving stage of a wireless communication system.

A further aspect of the present invention is to provide an apparatus and a method for adding ARQ feedback information of ARQ sub-blocks to ARQ feedback information of an ARQ block using an ExT field and an SEM field at a receiving stage of a wireless communication system.

In accordance with an aspect of the present invention, a method for generating an ARQ feedback message at a receiving stage in a wireless communication system is provided. The method includes generating first feedback information of at least one ARQ block, when at least one erroneous ARQ block includes an ARQ block constituted with at least two ARQ sub-blocks, determining whether any erroneous ARQ blocks include at least one successfully received ARQ sub-block, when at least one erroneous ARQ block includes at least one successfully received ARQ sub-block, adding second feedback information of the ARQ sub-blocks to the first feedback information of the ARQ blocks using a field indicating whether the second feedback information is added and a field indicating the erroneous ARQ blocks having the at least one successfully received ARQ sub-block, and sending the first feedback information with the second feedback information, to the transmitting stage.

In accordance with another aspect of the present invention, an apparatus for generating an ARQ feedback message at a receiving stage in a wireless communication system is provided. The apparatus includes an ARQ controller for performing ARQ feedback to a transmitting stage based on an ARQ feedback time, for checking for errors in an ARQ block received from the transmitting stage, for determining whether at least one erroneous ARQ block includes an ARQ block having at least two ARQ sub-blocks, and for determining whether the at least one erroneous ARQ block includes an ARQ block having at least one successfully received ARQ sub-block, an ARQ control message generator for generating first feedback information of the at least one ARQ block to perform the ARQ feedback under control of the ARQ controller, and when the at least one erroneous ARQ block includes the at least one successfully received ARQ sub-block, adding second feedback information of the ARQ sub-blocks to the first feedback information of the ARQ blocks using a field indicating whether the second feedback information is added and a field indicating the erroneous ARQ block having the at least one successfully received ARQ sub-block, and a transmitter for sending the first feedback information with the second feedback information of the ARQ sub-blocks added, to the transmitting stage.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide Exemplary embodiments of the present invention provide a technique for generating an Automatic Repeat reQuest (ARQ) feedback message at a receiving stage of a wireless communication system. A transmitting stage and a receiving stage include all of transmitting and receiving nodes constituting a wireless communication system, respectively, such as a base station controller, a Base Station (BS), a mobile station, a relay station, and the like. Mobile stations may also be known as subscriber stations, terminals, nodes, and similar terms. Examples of mobile stations include mobile phones, personal digital assistants, personal entertainment devices, laptop computers, and tablet computers.

ARQ processes are generally conducted in a Media Access Control (MAC) layer. Thus, for the ARQ, the transmitting stage generates an ARQ block or a retransmit ARQ block in the MAC layer for the ARQ process as shown in FIG. 1.

Figure 1A:
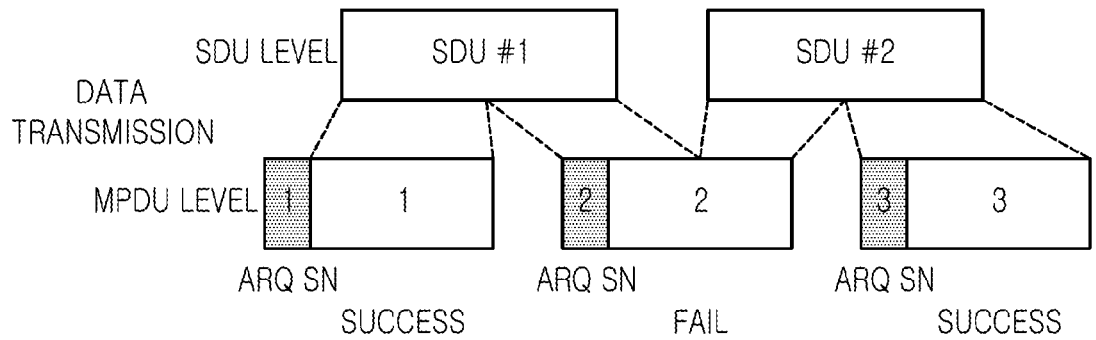
FIGS. 1A, 1B and 1C illustrate an ARQ block in a wireless communication system according to an exemplary embodiment of the present invention.
Figure 1B:
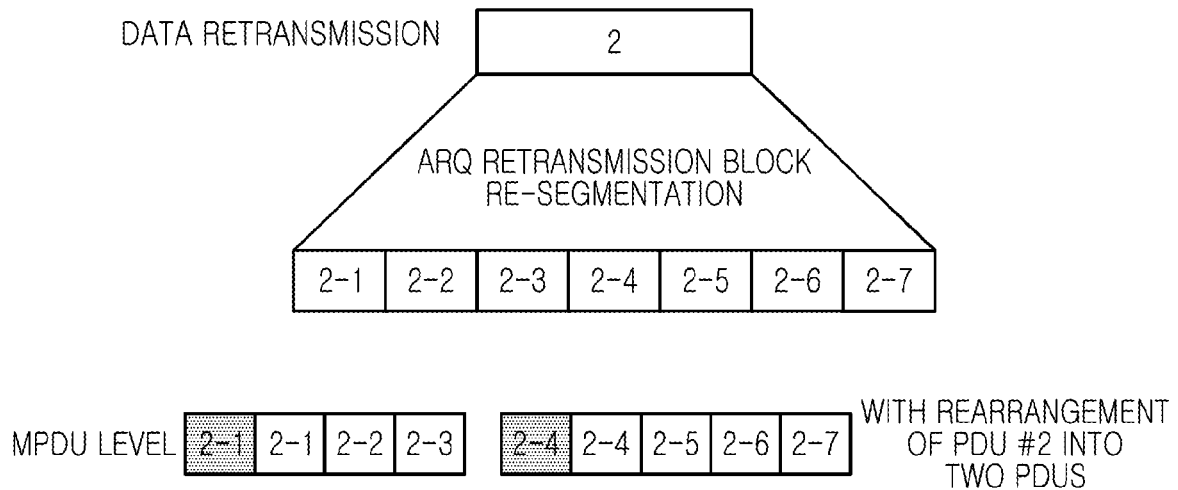
Figure 1C:

FIGS. 1A-1C illustrate the ARQ block in the wireless communication system according to an exemplary embodiment of the present invention. FIG. 1A depicts an ARQ block to carry data, FIG. 1B depicts ARQ sub-blocks to retransmit, and FIG. 1C depicts an ARQ block to retransmit.

Referring to FIGS. 1A-1C, the transmitting stage includes a MAC Protocol Data Unit (MPDU) which is a transmission unit of the MAC layer, by separating a Service Data Unit (SDU) sent from an upper layer to the MAC layer or combining a plurality of SDUs as shown in FIG. 1A.

When the ARQ is applied to the MPDU, the transmitting stage allocates an ARQ block Sequence Number (ARQ SN) on the MPDU basis. The transmitting stage sets one MPDU as one ARQ block. For example, when the upper layer sends two SDUs to the MAC layer, the transmitting stage generates three MPDUs with the two SDUs. In so doing, the transmitting stage allocates the ARQ SNs from #1 to #3 to the MPDUs respectively. The transmitting stage adds control information such as ARQ SN, to the MPDU in the same manner as a MAC header.

When the second ARQ block of the ARQ blocks sent by the transmitting stage is erroneous, the receiving stage requests the transmitting stage to retransmit the second ARQ block through the ARQ feedback. The transmitting stage can divide the erroneous ARQ block into a plurality of ARQ sub-blocks and retransmit the plurality of ARQ sub-blocks. For example, the transmitting stage segments the second ARQ block of the error into seven ARQ sub-blocks as shown in FIG. 1B. The transmitting stage generates and sends an MPDU including three ARQ sub-blocks and an MPDU including four ARQ sub-blocks to the receiving stage. The transmitting stage allocates an ARQ SUB-block SN (ARQ SUB SN) to each ARQ sub-block.

The transmitting stage may retransmit the original ARQ block of the erroneous ARQ block to the receiving stage. For example, the transmitting stage retransmits the original ARQ block of the second error ARQ block to the receiving stage as shown in FIG. 1C. The transmitting stage retransmits the MPDU for the second ARQ block including the ARQ SN to the receiving stage. When receiving the retransmitted ARQ block or ARQ sub-blocks, the receiving stage generates ARQ feedback information for the retransmitted ARQ block or ARQ sub-blocks using the ARQ SN of the ARQ block or the ARQ SUB SN of the ARQ sub-blocks.

The transmitting stage sends the ARQ block or the ARQ sub-blocks to the receiving stage. The receiving stage sends an ARQ feedback message generated using a cumulative ACKnowledge (ACK) scheme and a selective ACK scheme, to the transmitting stage as shown in FIG. 2.

Figure 2:
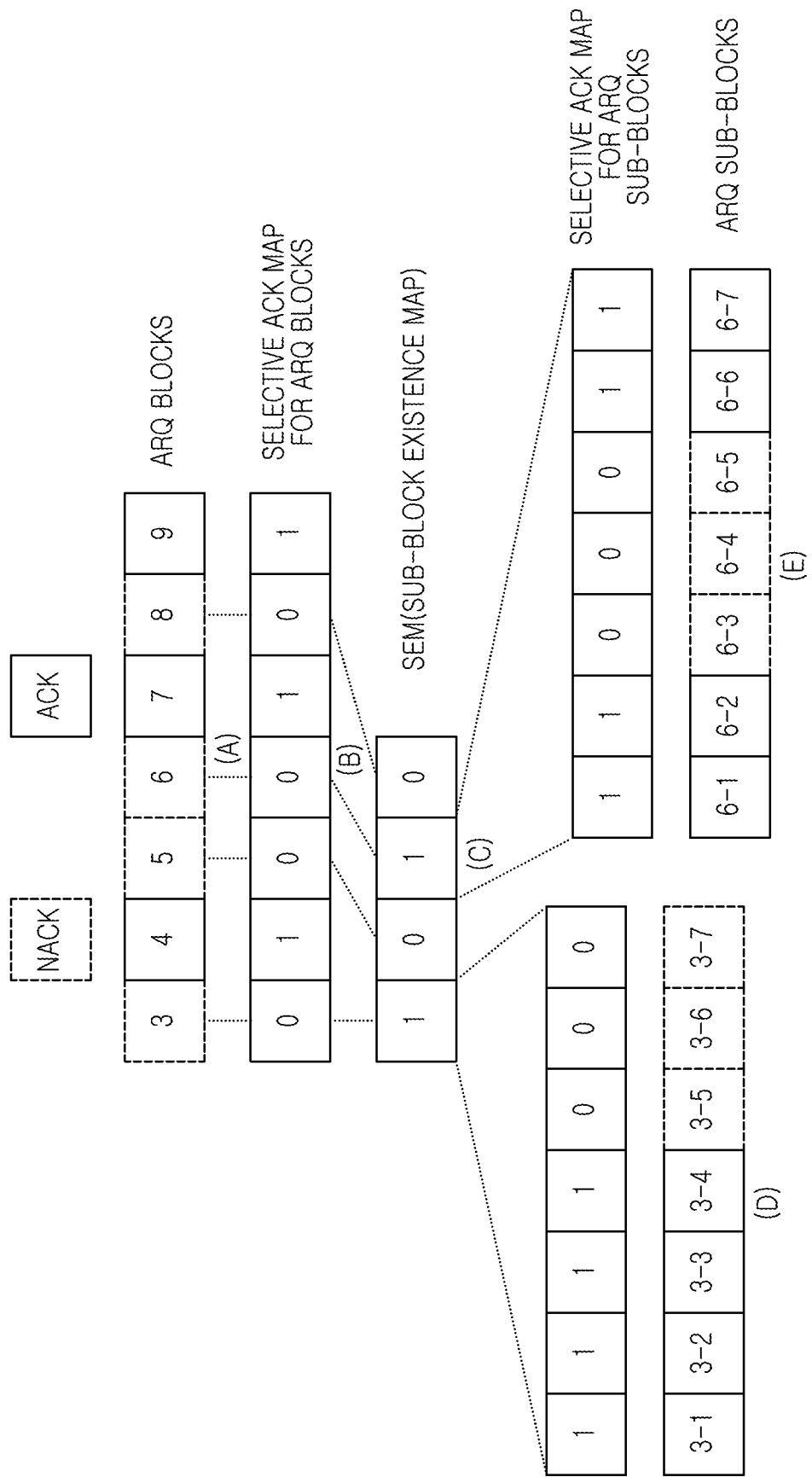
FIG. 2 illustrates an ARQ feedback message in a wireless communication system according to an exemplary embodiment of the present invention.

FIG. 2 depicts the ARQ feedback message in the wireless communication system according to an exemplary embodiment of the present invention.

Referring to FIG. 2, the receiving stage receives ARQ blocks from #3 to #9 from the transmitting stage as shown in FIG. 2 (A). The ARQ blocks #3, #5, #6, and #8 of the ARQ blocks received at the receiving stage are compromised.

When the ARQ blocks have errors as stated above, the receiving stage generates ARQ feedback information for the seven ARQ blocks using a selective ACK map as shown in FIG. 2 (B). For example, when the selective ACK map is of 7 bits, the receiving stage generates the selective ACK map '0100101'. The receiving stage can generate the ARQ feedback information to include the SN of the ARQ block #3 which is the first error.

The ARQ block may include at least one ARQ sub-block among the erroneous ARQ blocks indicated by the selective ACK map. When the ARQ block includes at least one ARQ sub-block among the erroneous ARQ blocks and the ARQ sub-blocks of the ARQ block includes an ARQ sub-block successfully received at the receiving stage, the receiving stage may need additional information to inform the transmitting stage of the error in the ARQ sub-blocks. The receiving stage may also need control information to indicate the existence of the additional information. For example, using ExT, the receiving stage indicates the existence of the information to add to the ARQ feedback information. As for the additional information, the receiving stage sets the ExT to '1'. When the ExT is '1', the transmitting stage recognizes that the erroneous ARQ block includes the successfully received ARQ sub-block. When the additional information is absent, the receiving stage sets the ExT to zero. When the ExT is zero, the transmitting stage recognizes that the erroneous ARQ block does not include the successfully received ARQ sub-block.

For example, when the third ARQ block and the sixth ARQ block each include at least one ARQ sub-block, and the ARQ sub-blocks of the third ARQ block and the sixth ARQ block include a successfully received ARQ sub-block, the receiving stage should send ARQ feedback information of the ARQ sub-block to the transmitting stage. The receiving stage marks the ARQ block indicating the ACK/NACK information of the ARQ sub-block using a Sub-block Existence MAP (SEM) as shown in FIG. 2 (C).

For example, the receiving stage generates the SEM with four bits to mark the ARQ block indicating the ACK/NACK information of the ARQ sub-block among the erroneous ARQ blocks. The receiving stage records '1' as the SEM bit indicating the third and sixth ARQ blocks including the ARQ sub-blocks, and records '0' as the SEM bit indicating the fifth and eighth ARQ blocks including no ARQ sub-blocks. If every ARQ sub-block of the ARQ block is compromised, the receiving stage records the SEM bit indicating the corresponding ARQ block as '0'. The receiving stage records '1' as the SEM bit indicating the ARQ block including the successfully received ARQ sub-block among the erroneous ARQ blocks. The receiving stage indicates the existence of the SEM using the ExT.

In addition, the receiving stage generates ACK/NACK information for the ARQ sub-blocks of the ARQ block including the SEM '1', and sends the ACK/NACK information to the transmitting stage. For example, the receiving stage may successfully receive the ARQ sub-blocks from 3-1 to 3-4 of the third ARQ block, but the ARQ sub-blocks 3-5 through 3-7 may have errors. In this case, the receiving stage can record '1111000' in the selective ACK map for the ARQ sub-blocks as shown in FIG. 2 (D). Similarly, the receiving stage may successfully receive the ARQ sub-blocks 6-1, 6-2, 6-6 and 6-7 of the sixth ARQ block, and the ARQ sub-blocks 6-3, 6-4 and 6-5 are compromised. The receiving stage can record '1100011' in the selective ACK map for the ARQ sub-blocks as shown in FIG. 2 (E).

The receiving stage can add the ARQ feedback information of the ARQ sub-blocks to the ARQ feedback information of the ARQ block using an ExT field and a SEM field as shown in Table 1. The receiving stage generates the ARQ feedback information for the ARQ block and the ARQ sub-blocks using the cumulative ACK scheme and the selective ACK scheme. The receiving stage generates the ARQ feedback information in the form of an Information Element (IE).

TABLE 1

| Syntax | Size(bit) | Notes |
| --- | --- | --- |
| ARQ_feedback_IE(LAST){ | variable | |
| Last | 1 | 0 = More ARQ Feedback IE in the list |
| | | 1 = Last ARQ Feedback IE in the list |
| Flow ID | 4 | The ID of the connection(flow) being referenced |
| FLAG1 | 1 | 0 = Cumulative ACK |
| | | 1 = Selective ACK MAP existence |
| SN | 10 | FLAG = 0, ARQ block up to and including SN has been received successfully. |
| | | FLAG = 1, ARQ block less than SN has been received successfully. |
| if(FLAG1==1){ | | |
| Selective ACK MAP 1 | 6 | Each bit represents ACK or NACK of corresponding ARQ block. '0' is NACK and '1' is ACK. |
| | | First MSB of first Selective ACK MAP1 represents ACK or NACK information of SN. Contiguous bits after first MSB of first ACK MAP correspond to contiguous SN. |
| ExT | 1 | Extension for ARQ sub-block indication |
| | | 0 = No ARQ sub-block ACK/NACK indication |

TABLE 1-continued

| Syntax | Size(bit) | Notes |
| --- | --- | --- |
| FLAG1 | 1 | 1 = ARQ sub-block ACK/NACK indication follows<br>0 = No more selective ACK MAP1 and FLAG1<br>1 = Another set of selective ACK MAP1 and FLAG1 follows |
| while(FLAG1==1){ | | |
| Selective ACK MAP1 | 7 | Each bit represents ACK or NACK of corresponding ARQ block. '0' is NACK and '1' is ACK.<br>Selective ACK MAP1 represents ACK or NACK information of ARQ blocks after first selective ACK MAP1. |
| FLAG1 | 1 | 0 = No more selective ACK MAP1 and FLAG1<br>1 = Another set of selective ACK MAP1 and FLAG1 follow |
| }<br>if(Ext==1){ | | |
| SEM | variable | Sub-block-Existence bitMap<br>The numbers of SEM bits are same as NACKed ARQ block in the Selective ACK MAP1. Each bit represents the existence of partially NACKed ARQ blocks or completely NACKed ARQ blocks.<br>1 = Partially NACKed ARQ block (the ARQ block has some sub-blocks which have been received correctly)<br>0 = Completely NACKed ARQ blocks (the ARQ block has no sub-blocks which have been received correctly) |
| for(i=0;i<Num_block<i++){ | | Num_block is the number of bits equal to 1 in the SEM field |
| FLAG2 | 1 | 0 = Cumulative ACK<br>1 = Selective ACK MAP existence |
| SSN | xxx | FLAG2 = 0, ARQ sub-block up to and including SSN has been received successfully.<br>FLAG2 = 1, ARQ sub-block less than SSN has been received successfully |
| while(FLAG2==1){ | | |
| Selective ACK MAP2 | 7 | Each bit represents ACK or NAK of corresponding ARQ sub-block; '0' is NACK and '1' is ACK.<br>First MSB of first Selective ACK MAP2 represents ACK or NACK information of SSN. Contiguous bits after first MSB of first selective ACK MAP2 correspond to contiguous SSN. |
| FLAG2 | 1 | 0 = No more selective ACK MAP2 and FLAG2<br>1 = Another set of selective ACK MAP2 and FLAG2 follows |
| }<br>}<br>Padding<br>}<br>}<br>} | variable | For Byte alignment |

The ARQ feedback information includes a LAST field indicating another ARQ feedback information, a Flow ID field indicating an IDentifier (ID) of the connection or the flow applying the ARQ, a FLAG1 field indicating which one of the cumulative ACK scheme and the selective ACK map is used to feed back the ACK/NACK information of the ARQ block, and an SN field indicating the ARQ SN contained in the ARQ feedback information of the cumulative ACK scheme. The LAST field indicates whether ARQ feedback information of the different Flow ID from Table 1 follows Table 1. When the FLAG1 is zero, the SN field indicates the greatest ARQ SN of the successfully received ARQ blocks. When the FLAG 1 is '1', the SN field indicates the ARQ SN of the first unsuccessfully retrieved ARQ block.

When the FLAG1 is '1', the ARQ feedback information further includes an ExT field indicating whether the ARQ feedback information includes the ACK/NACK information of the ARQ sub-blocks of the ARQ block, a selective ACK map 1 field indicating errors in the ARQ blocks, which is not indicated using the cumulative ACK scheme, and a FLAG 1 field indicating existence of the additional selective ACK map 1 field. The ExT field indicates whether the erroneous ARQ blocks includes the ARQ block which includes the ARQ sub-blocks and have error in only some of the ARQ sub-blocks. Accordingly, when the ARQ feedback information does not include the ACK/NACK information of the ARQ sub-blocks, the ExT field is '0'. When the ACK/NACK information of the ARQ sub-blocks is contained, the ExT field is '1'.

When the ExT field is '1', the ARQ feedback information includes a SEM field indicating the ARQ block including the ARQ sub-blocks and having errors in only some of the ARQ sub-blocks among the erroneous ARQ blocks, a FLAG2 field indicating which of the cumulative ACK scheme and the selective ACK map is used to feed back the ACK/NACK information of the ARQ sub-blocks with respect to each ARQ block including the SEM field '1', and an SSN field indicating the SN of the ARQ sub-block contained in the ARQ feedback information based on the cumulative ACK scheme or the selective ACK scheme. When the selective ACK scheme is used, the ARQ feedback information further includes a selective ACK map 2 field indicating errors with the ARQ sub-blocks. The SEM field is '1' when the erroneous ARQ blocks include the ARQ sub-blocks and some of the ARQ sub-blocks are successfully received. When the erroneous ARQ blocks do not include the ARQ sub-blocks or when the erroneous ARQ blocks include the ARQ sub-blocks but all of the ARQ sub-blocks are compromised, the SEM field is '0'.

The receiving stage can add the ARQ feedback information of the ARQ sub-blocks to the ARQ feedback information of the ARQ block using the ExT field and the SEM field as shown in Table 2. The receiving stage may generate the ARQ feedback information of the ARQ block using the cumulative ACK scheme and the selective ACK scheme and may generate the ARQ feedback information of the ARQ sub-blocks using the selective ACK scheme. Herein, the receiving stage generates the ARQ feedback information in the form of the IE.

TABLE 2

| Syntax | Size(bit) | Notes |
|---|---|---|
| ARQ_feedback_IE(LAST){ | variable | |
| Last | 1 | 0 = More ARQ Feedback IE in the list<br>1 = Last ARQ Feedback IE in the list |
| Flow ID | 4 | The ID of the connection(flow) being referenced |
| FLAG1 | 1 | 0 = Cumulative ACK<br>1 = Selective ACK MAP existence |
| SN | 10 | FLAG = 0, ARQ block up to and including SN has been received successfully.<br>FLAG = 1, ARQ block less than SN has been received successfully. |
| if(FLAG1==1){ | | |
| Selective ACK MAP 1 | 6 | Each bit represents ACK or NACK of corresponding ARQ block. '0' is NACK and '1' is ACK.<br>First MSB of first Selective ACK MAP1 represents ACK or NACK information of SN. Contiguous bits after first MSB of first ACK MAP correspond to contiguous SN. |
| ExT | 1 | Extension for ARQ sub-block indication<br>0 = No ARQ sub-block ACK/NACK indication<br>1 = ARQ sub-block ACK/NACK indication follows |
| FLAG1 | 1 | 0 = No more selective ACK MAP1 and FLAG1<br>1 = Another set of selective ACK MAP1 and FLAG1 follows |
| while(FLAG1==1){ | | |
| Selective ACK MAP1 | 7 | Each bit represents ACK or NACK of corresponding ARQ block. '0' is NACK and '1' is ACK.<br>Selective ACK MAP1 represents ACK or NACK information of ARQ blocks after first selective ACK MAP1. |
| FLAG1 | 1 | 0 = No more selective ACK MAP1 and FLAG1<br>1 = Another set of selective ACK MAP1 and FLAG1 follows |
| }<br>if(Ext==1){ | | |
| SEM | variable | Sub-block-Existence Map<br>The numbers of SEM bits are same as NACKed ARQ block in the Selective ACK MAP1. Each bit represents the existence of partially NACKed ARQ blocks or completely NACKed ARQ blocks.<br>1 = Partially NACKed ARQ block (the ARQ block has some sub-blocks which have been received correctly)<br>0 = Completely NACKed ARQ blocks (the ARQ block has no sub-blocks which have been received correctly) |

TABLE 2-continued

| Syntax | Size(bit) | Notes |
|---|---|---|
| for(i=0;i<Num_block<i++){ | | Num_block is the number of bits equal to 1 in the SEM field |
| Do{ | | |
| Selective ACK MAP2 | 7 | Each bit represents ACK or NACK of corresponding ARQ sub-block. '0' is NACK and '1' is ACK. First MSB of first Selective ACK MAP2 represents ACK or NACK information of first ARQ sub-block of ARQ block. Contiguous bits after first MSB of first selective ACK2 correspond to contiguous SSN. |
| FLAG2 | 1 | 0 = No more selective ACK MAP2 and FLAG2<br>1 = Another set of selective ACK MAP2 and FLAG2 follows |
| }while(FLAG2==1) | | |
| } | | |
| Padding | variable | For Byte alignment |
| } | | |
| } | | |
| } | | |

The ARQ feedback information includes the LAST field indicating another ARQ feedback information, the Flow ID field indicating the ID of the connection or the flow applying the ARQ, the FLAG1 field indicating which one of the cumulative ACK scheme and the selective ACK map is used to feed back the ACK/NACK information of the ARQ block, and the SN field indicating the ARQ SN contained in the ARQ feedback information of the cumulative ACK scheme. The LAST field indicates whether ARQ feedback information of the different Flow ID from Table 2 follows Table 2. When the FLAG1 is zero, the SN field indicates the greatest ARQ SN of the ARQ blocks successfully received. When the FLAG1 is '1', the SN field indicates the ARQ SN of the first ARQ block failed to receive.

When the FLAG1 is '1', the ARQ feedback information further includes the ExT field indicating whether the ARQ feedback information includes the ACK/NACK information of the ARQ sub-blocks of the ARQ block, the selective ACK map 1 field indicating errors in the ARQ blocks, which is not indicated using the cumulative ACK scheme, and the FLAG 1 field indicating existence of the additional selective ACK map 1 field. The ExT field indicates whether the erroneous ARQ blocks include the ARQ block including the ARQ sub-blocks and having error in only some of the ARQ sub-blocks. Accordingly, when the ARQ feedback information does not include the ACK/NACK information of the ARQ sub-blocks, the ExT field is '0'. When the ACK/NACK information of the ARQ sub-blocks is included, the ExT field is '1'.

When the ExT field is '1', the ARQ feedback information includes the SEM field indicating the ARQ block including the ARQ sub-blocks and having errors in only some of the ARQ sub-blocks among the erroneous ARQ blocks, a selective ACK map 2 field indicating errors with the ARQ sub-blocks constituting the ARQ block with the SEM field marked '1', and the FLAG2 field indicating existence of the additional selective ACK map 2 field. The SEM field is '1' when the erroneous ARQ blocks include the ARQ sub-blocks and some of the ARQ sub-blocks are compromised. When the erroneous ARQ blocks do not include ARQ sub-blocks or when the erroneous ARQ blocks include ARQ sub-blocks but all of the ARQ sub-blocks are compromised, the SEM field is '0'.

The receiving stage can add the ARQ feedback information of the ARQ sub-blocks to the ARQ feedback information of the ARQ block using the ExT field and the SEM field as shown in Table 3. The receiving stage may generate the ARQ feedback information of the ARQ block using the cumulative ACK scheme and the selective ACK scheme and may generate the ARQ feedback information of the ARQ sub-blocks using the cumulative ACK scheme and a sequence ACK scheme. For example, when the sequence ACK scheme is used, the receiving stage indicates the ACK/NACK information of the ARQ sub-blocks on the group basis, without representing the ACK/NACK information of the ARQ sub-blocks individually. The receiving stage generates the ARQ feedback information in the form of an IE.

TABLE 3

| Syntax | Size(bit) | Notes |
|---|---|---|
| ARQ_feedback_IE(LAST){ | variable | |
| Last | 1 | 0 = More ARQ Feedback IE in the list<br>1 = Last ARQ Feedback IE in the list |
| Flow ID | 4 | The ID of the connection(flow) being referenced |
| FLAG1 | 1 | 0 = Cumulative ACK<br>1 = Selective ACK MAP existence |
| SN | 10 | FLAG = 0, ARQ block up to and including SN has been received successfully.<br>FLAG = 1, ARQ block less than SN has been received successfully. |

TABLE 3-continued

| Syntax | Size(bit) | Notes |
|---|---|---|
| if(FLAG1==1){ | | |
| Selective ACK MAP 1 | 6 | Each bit represents ACK or NACK of corresponding ARQ block. '0' is NACK and '1' is ACK.<br>First MSB of first Selective ACK MAP1 represents ACK or NACK information of SN. Contiguous bits after first MSB of first ACK MAP correspond to contiguous SN. |
| ExT | 1 | Extension for ARQ sub-block indication<br>0 = No ARQ sub-block ACK/NACK indication<br>1 = ARQ sub-block ACK/NACK indication follows |
| FLAG1 | 1 | 0 = No more selective ACK MAP1 and FLAG1<br>1 = Another set of selective ACK MAP1 and FLAG1 follows |
| while(FLAG1==1){ | | |
| Selective ACK MAP1 | 7 | Each bit represents ACK or NACK of corresponding ARQ block. '0' is NACK and '1' is ACK.<br>Selective ACK MAP1 represents ACK or NACK information of ARQ block after first selective ACK MAP1. |
| FLAG1 | 1 | 0 = No more selective ACK MAP1 and FLAG1<br>1 = Another set of selective ACK MAP1 and FLAG1 follows |
| }<br>if(Ext==1){ | | |
| SEM | variable | Sub-block-Existence bitMap<br>The numbers of SEM bits are same as NACKed ARQ block in the Selective ACK MAP1. Each bit represents the existence of partially NACKed ARQ blocks or completely NACKed ARQ blocks.<br>1 = Partially NACKed ARQ block (the ARQ block has some sub-blocks which have received correctly)<br>0 = Completely NACKed ARQ blocks (the ARQ block has no sub-blocks which have been received correctly) |
| for(i=0;i<Num_block<i++){ | | Num_block is the number of bits equal to 1 in the SEM field |
| FLAG2 | 1 | 0 = Cumulative ACK<br>1 = Sequence ACK MAP existence |
| SSN | xxx | ARQ sub-block sequence number |
| while(FLAG2==1){ | | |
| Sequence format | 1 | 0 = 2 blocks sequence format<br>1 = 3 blocks sequence format |
| if(Sequence format==0){ | | |
| Sequence ACK MAP | 2 | Each bit represents set of ARQ sub-blocks received, correctly or not. MSB of sequence ACK MAP represents ACK or NACK information of first group of ARQ-sub-blocks.<br>1 = Number of the ARQ blocks in the Sequence × Length field received correctly<br>0 = Number of ARQ blocks in the Sequence × Length field received incorrectly. |
| Sequence 1 Length | 6 | Number of ARQ sub-blocks. MSB of sequence ACK MAP corresponds to Sequence 1 Length field. |
| Sequence 2 Length | 6 | Number of ARQ sub-blocks. LSB of sequence ACK MAP corresponds to Sequence 2 Length field. |
| }<br>else{ | | |
| Sequence ACK MAP | 3 | Each bit represents set of ARQ sub-blocks received, correctly or not. MSB of first sequence ACK MAP represents ACK or NACK information of first group of ARQ-sub-blocks.<br>1 = Number of the ARQ blocks in the |

TABLE 3-continued

| Syntax | Size(bit) | Notes |
| --- | --- | --- |
| | | Sequence × Length field received correctly<br>0 = Number of ARQ blocks in the Sequence × Length field received incorrectly. |
| Sequence 1 Length | 3 | Number of ARQ sub-blocks. MSB of sequence ACK MAP corresponds to Sequence 1 Length |
| Sequence 2 Length | 4 | Number of ARQ sub-blocks. Second Bit of sequence ACK MAP corresponds to Sequence 2 Length field. |
| Sequence 3 Length | 4 | Number of ARQ sub-blocks. LSB of sequence ACK MAP corresponds to Sequence 3 Length field. |
| }<br>FLAG2 | 1 | 0 = No more sequence ACK MAP<br>1 = Another set of sequence ACK MAP and FLAG2 follows |
| }<br>}<br>Padding<br>}<br>}<br>} | variable | For Byte alignment |

The ARQ feedback information includes the LAST field indicating another ARQ feedback information, the Flow ID field indicating the ID of the connection or the flow applying the ARQ, the FLAG1 field indicating which one of the cumulative ACK scheme and the selective ACK map is used to feed back the ACK/NACK information of the ARQ block, and the SN field indicating the ARQ SN contained in the ARQ feedback information of the cumulative ACK scheme. The LAST field indicates whether ARQ feedback information of the different Flow ID from Table 3 follows Table 3. When the FLAG1 is zero, the SN field indicates the greatest ARQ SN of the ARQ blocks successfully received. When the FLAG 1 is '1', the SN field indicates the ARQ SN of the first ARQ block failed to receive.

When the FLAG1 is '1', the ARQ feedback information further includes the ExT field indicating whether the ARQ feedback information includes the ACK/NACK information of the ARQ sub-blocks of the ARQ block, the selective ACK map 1 field indicating errors in the ARQ blocks, which is not indicated using the cumulative ACK scheme, and the FLAG 1 field indicating existence of the additional selective ACK map 1 field. The ExT field indicates whether the erroneous ARQ blocks include the ARQ block having errors in only some of the ARQ sub-blocks. Accordingly, when the ARQ feedback information does not include the ACK/NACK information of the ARQ sub-blocks, the ExT field is '0'. When the ACK/NACK information of the ARQ sub-blocks is contained, the ExT field is '1'.

When the ExT field is '1', the ARQ feedback information further includes the SEM field indicating the ARQ block including the ARQ sub-blocks and having errors in only some of the ARQ sub-blocks, the FLAG2 field indicating which one of the cumulative ACK scheme and the sequence ACK map is used to feed back the ACK/NACK information of the ARQ sub-blocks of the ARQ block with the SEM field marked '1', the SSN field indicating the ARQ SUB SN contained in the ARQ feedback information of the cumulative ACK scheme and the sequence ACK map scheme, a sequence format field indicating a sequence format representing the ACK/NACK information of the ARQ sub-blocks, a sequence ACK map field indicating the ACK/NACK information of the group representing the ACK/NACK information of the ARQ sub-blocks, a sequence K length field indicating the number of the ARQ sub-blocks representing the ACK/NACK information through the k-th group, and the FLAG2 field indicating existence of the additional sequence ACK map field. The SEM field is '1' for the ARQ block including the ARQ sub-blocks and having error in only some of the ARQ sub-blocks. The SEM field is '0' for the ARQ block not including the ARQ sub-blocks or the ARQ block including the ARQ sub-blocks but having errors in every ARQ sub-block.

For example, when the ARQ block includes ten ARQ sub-blocks, the first five ARQ sub-blocks are the ACK, and the last five ARQ sub-blocks are the NACK, the receiving stage records '10' in the 2-bit sequence ACK map, '5' in the sequence 1 length, and '5' in the sequence 2 length in Table 3.

The receiving stage can add the ARQ feedback information of the ARQ sub-blocks to the ARQ feedback information of the ARQ block using the ExT field and the SEM field as shown in Table 4. The receiving stage may generate the ARQ feedback information of the ARQ block using the cumulative ACK scheme and the selective ACK scheme and may generate the ARQ feedback information of the ARQ sub-blocks using the sequence ACK scheme. For example, when the sequence ACK scheme is used, the receiving stage indicates the ACK/NACK information of the ARQ sub-blocks on the group basis, rather than indicating the ACK/NACK information of the ARQ sub-blocks individually. The receiving stage generates the ARQ feedback information in the form of an IE.

TABLE 4

| Syntax | Size(bit) | Notes |
| --- | --- | --- |
| ARQ_feedback_IE(LAST){ | variable | |
| Last | 1 | 0 = More ARQ Feedback IE in the list<br>1 = Last ARQ Feedback IE in the list |

TABLE 4-continued

| Syntax | Size(bit) | Notes |
|---|---|---|
| Flow ID | 4 | The ID of the connection (flow) being referenced |
| FLAG1 | 1 | 0 = Cumulative ACK<br>1 = Selective ACK MAP existence |
| SN | 10 | FLAG = 0, ARQ block up to and including SN has been received successfully.<br>(FLAG = 1, ARQ block less than SN has been received successfully. |
| if(FLAG1==1){ | | |
| Selective ACK MAP 1 | 6 | Each bit represents ACK or NACK of corresponding ARQ block. '0' is NACK and '1' is ACK.<br>First MSB of first Selective ACK MAP1 represents ACK or NACK information of SN. Contiguous bits after first MSB of first ACK MAP correspond to contiguous SN. |
| ExT | 1 | Extension for ARQ sub-block indication<br>0 = No ARQ sub-block ACK/NACK indication<br>1 = ARQ sub-block ACK/NACK indication follows |
| FLAG1 | 1 | 0 = No more selective ACK MAP1 and FLAG1<br>1 = Another set of selective ACK MAP1 and FLAG1 follows |
| while(FLAG1==1){ | | |
| Selective ACK MAP1 | 7 | Each bit represents ACK or NACK of corresponding ARQ block. '0' is NACK and '1' is ACK.<br>Selective ACK MAP1 represents ACK or NACK information of ARQ block after first selective ACK MAP1. |
| FLAG1 | 1 | 0 = No more selective ACK MAP1 and FLAG1<br>1 = Another set of selective ACK MAP1 and FLAG1 follows |
| } | | |
| if(Ext==1){ | | |
| SEM | variable | Sub-block-Existence bitMap<br>The numbers of SEM bits are same as NACKed ARQ block in the Selective ACK MAP1. Each bit represents the existence of partially NACKed ARQ blocks or completely NACKed ARQ blocks.<br>1 = Partially NACKed ARQ block (the ARQ block has some sub-blocks which have been received correctly)<br>0 = Completely NACKed ARQ blocks (the ARQ block has no sub-blocks which have been received correctly) |
| for(i=0;i<Num_block<i++){ | | Num_block is the number of bits equal to 1 in the SEM field |
| Do{ | | |
| Sequence format | 1 | 0 = 2 blocks sequence format<br>1 = 3 blocks sequence format |
| if(Sequence format == 0){ | | |
| Sequence ACK MAP | 2 | Each bit represents set of ARQ sub-blocks received, correctly or not. MSB of sequence ACK MAP represents ACK or NACK information of first group of ARQ-sub-blocks.<br>1 = Number of the ARQ blocks in the Sequence × Length field received correctly<br>0 = Number of ARQ blocks in the Sequence × Length field received incorrectly. |
| Sequence 1 Length | 6 | Number of ARQ sub-blocks. MSB of sequence ACK MAP corresponds to Sequence 1 Length field. |

TABLE 4-continued

| Syntax | Size(bit) | Notes |
|---|---|---|
| Sequence 2 Length | 6 | Number of ARQ sub-blocks. LSB of sequence ACK MAP corresponds to Sequence 2 Length field. |
| }<br>else{ | | |
| Sequence ACK MAP | 3 | Each bit represents set of ARQ sub-blocks received, correctly or not. MSB of first sequence ACK MAP represents ACK or NACK information of first group of ARQ-sub-blocks.<br>1 = Number of the ARQ blocks in the Sequence × Length field received correctly<br>0 = Number of ARQ blocks in the Sequence × Length field received incorrectly. |
| Sequence 1 Length | 3 | Number of ARQ sub-blocks. MSB of sequence ACK MAP corresponds to Sequence 1 Length |
| Sequence 2 Length | 4 | Number of ARQ sub-blocks. Second Bit of sequence ACK MAP is corresponding to Sequence 2 Length field. |
| Sequence 3 Length | 4 | Number of ARQ sub-blocks. LSB of sequence ACK MAP corresponds to Sequence 3 Length field. |
| }<br>FLAG2 | 1 | 0 = No more sequence ACK MAP<br>1 = Another set of sequence ACK MAP and FLAG2 follows |
| }while(FLAG2==1)<br>}<br>Padding<br>}<br>}<br>} | variable | For Byte alignment |

The ARQ feedback information includes the LAST field indicating another ARQ feedback information, the Flow ID field indicating the ID of the connection or the flow applying the ARQ, the FLAG1 field indicating which one of the cumulative ACK scheme and the selective ACK map is used to feed back the ACK/NACK information of the ARQ block, and the SN field indicating the ARQ SN contained in the ARQ feedback information of the cumulative ACK scheme. The LAST field indicates whether ARQ feedback information of the different Flow ID from Table 4 follows Table 4. When the FLAG1 is zero, the SN field indicates the greatest ARQ SN of the ARQ blocks successfully received. When the FLAG1 is '1', the SN field indicates the ARQ SN of the first ARQ block not received correctly.

When the FLAG1 is '1', the ARQ feedback information further includes the ExT field indicating whether the ARQ feedback information includes the ACK/NACK information of the ARQ sub-blocks of the ARQ block, the selective ACK map 1 field indicating errors in the ARQ blocks, which is not indicated using the cumulative ACK scheme, and the FLAG 1 field indicating existence of the additional selective ACK map 1 field. The ExT field indicates whether the erroneous ARQ blocks include the ARQ block including the ARQ sub-blocks and having errors in only some of the ARQ sub-blocks. Accordingly, when the ARQ feedback information does not include the ACK/NACK information of the ARQ sub-blocks, the ExT field is '0'. When the ACK/NACK information of the ARQ sub-blocks is included, the ExT field is '1'.

When the ExT field is '1', the ARQ feedback information further includes the SEM field indicating the ARQ block including the ARQ sub-blocks and having errors in only some of the ARQ sub-blocks among the erroneous ARQ blocks, the sequence format field indicating the sequence format representing the ACK/NACK information of the ARQ sub-blocks with respect to the ARQ block with the SEM field marked '1', the sequence ACK map field indicating the ACK/NACK information of the group representing the ACK/NACK information of the ARQ sub-blocks, the sequence K length field indicating the number of the ARQ sub-blocks representing the ACK/NACK information through the k-th group, and the FLAG2 field indicating existence of the additional sequence ACK map field. The SEM field is '1' on the ARQ block including the ARQ sub-blocks and having errors in only some of the ARQ sub-blocks. The SEM field is '0' on the ARQ block not including the ARQ sub-blocks or the ARQ block including the ARQ sub-blocks but having errors in every ARQ sub-block.

The receiving stage can add the ARQ feedback information of the ARQ sub-blocks to the ARQ feedback information of the ARQ block using the ExT field and the SEM field as shown in Table 5. The receiving stage may generate the ARQ feedback information of the ARQ block using the cumulative ACK scheme and the selective ACK scheme and may generate the ARQ feedback information of the ARQ sub-blocks using a consecutive ACK scheme. For example, when the consecutive ACK scheme is used, the receiving stage indicates the ACK/NACK information of the ARQ sub-blocks on the group basis, rather than indicating the ACK/NACK information of the ARQ sub-blocks individually. The ACK information of the ARQ sub-blocks specifies only the information relating to the ARQ sub-blocks successfully received at the receiving stage. Thus, the transmitting stage recognizes that the receiving stage does not successfully receive the ARQ sub-block not marked with the ACK, in the ACK information of the ARQ sub-blocks received from the receiving stage. Herein, the receiving stage generates the ARQ feedback information in the form of the IE.

TABLE 5

| Syntax | Size(bit) | Notes |
|---|---|---|
| ARQ_feedback_IE(LAST) | variable | |
| { | | |
| Last | 1 | 0 = More ARQ Feedback IE in the list<br>1 = Last ARQ Feedback IE in the list |
| Flow ID | 4 | The ID of the connection(flow) being referenced |
| FLAG1 | 1 | 0 = Cumulative ACK<br>1 = Selective ACK MAP existence |
| SN | 10 | FLAG = 0, ARQ block up to and including SN has been received successfully.<br>FLAG = 1, ARQ block less than SN has been received successfully. |
| if(FLAG1==1){ | | |
| Selective ACK MAP 1 | 6 | Each bit represents ACK or NACK of corresponding ARQ block. '0' is NACK and '1' is ACK.<br>First MSB of first Selective ACK MAP1 represents ACK or NACK information of SN.<br>Contiguous bits after first MSB of first ACK MAP correspond to contiguous SN. |
| ExT | 1 | Extension for ARQ sub-block indication<br>0 = No ARQ sub-block ACK/NACK indication<br>1 = ARQ sub-block ACK/NACK indication follows |
| FLAG1 | 1 | 0 = No more selective ACK MAP1 and FLAG1<br>1 = Another set of selective ACK MAP1 and FLAG1 follows |
| while(FLAG1==1){ | | |
| Selective ACK MAP1 | 7 | Each bit represents ACK or NACK of corresponding ARQ block. '0' is NACK and '1' is ACK.<br>Selective ACK MAP1 represents ACK or NACK<br>information of ARQ block after first selective ACK MAP1. |
| FLAG1 | 1 | 0 = No more selective ACK MAP1 and FLAG1<br>1 = Another set of selective ACK MAP1 and FLAG1 follows |
| } | | |
| if(Ext==1){ | | |
| SEM | variable | Sub-block-Existence bitMap<br>The numbers of SEM bits are same as NACKed ARQ block in the Selective ACK MAP1. Each bit represents the existence of partially NACKed ARQ blocks or completely NACKed ARQ blocks.<br>1 = Partially NACKed ARQ block (the ARQ block has some sub-blocks which have been received correctly)<br>0 = Completely NACKed ARQ blocks (the ARQ block has no sub-blocks which have been received correctly) |
| for(i=0;i<Num_block<i++) | | Num_block is the number of bits equal to 1 in the SEM field |
| { | | |
| do{ | | |
| START_SSN | xxx | Start of ARQ sub-block SN which was received correctly |
| Num_SSN | xxx | Number of consecutive ARQ sub-blocks which were received correctly from START_SSN onwards |
| End | 1 | 0 = One more set of START_SSN. Length and End fields<br>1 = There are no more START_SSN, NUM_SSN and End fields |
| }while(End==0) | | |
| } | | |
| Padding | variable | For Byte alignment |
| } | | |
| } | | |
| } | | |

The ARQ feedback information includes the LAST field indicating another ARQ feedback information, the Flow ID field indicating the ID of the connection or the flow applying the ARQ, the FLAG1 field indicating which one of the cumulative ACK scheme and the selective ACK map is used to feed back the ACK/NACK information of the ARQ block, and the SN field indicating the ARQ SN contained in the ARQ feedback information of the cumulative ACK scheme. The LAST field indicates whether ARQ feedback information of the different Flow ID from Table 5 follows Table 5. When the FLAG1 is zero, the SN field indicates the greatest ARQ SN of the ARQ blocks successfully received. When the FLAG 1 is '1', the SN field indicates the ARQ SN of the first ARQ block failed to receive.

When the FLAG1 is '1', the ARQ feedback information further includes the ExT field indicating whether the ARQ feedback information includes the reception information of the ARQ sub-blocks of the ARQ block, the selective ACK map 1 field indicating errors in the ARQ blocks, which is not indicated using the cumulative ACK scheme, and the FLAG1 field indicating existence of the additional selective ACK map 1 field. The ExT field indicates whether the erroneous ARQ blocks include the ARQ block including the ARQ sub-blocks and having errors in only some of the ARQ sub-blocks. Accordingly, when the ARQ feedback information does not include the reception information of the ARQ sub-blocks, the ExT field is '0'. When the reception information of the ARQ sub-blocks is included, the ExT field is '1'.

When the ExT field is '1', the ARQ feedback information includes the SEM field indicating the ARQ block including the ARQ sub-blocks and having errors in only some of the ARQ sub-blocks, a START_SSN field indicating the SN of the first ARQ sub-block (SSN) successfully received at the receiving stage among the ARQ sub-blocks of the ARQ block with the SEM field marked '1', a Num_SSN field indicating the number of the ARQ blocks successfully received in succession after the first successfully received ARQ sub-block, and an End field indicating the number of repetitions of the START_SSN field and the Num_SSN field.

When generating the ARQ feedback information of the ARQ sub-blocks using the consecutive ACK scheme, the receiving stage generates the ARQ feedback information to indicate only the information relating to the successfully received ARQ sub-block in one ARQ block including the ARQ sub-blocks. Accordingly, the receiving stage can indicate whether the ARQ sub-block are received using the START_SSN field, the Num_SSN field, and the End field. For example, when the transmitting stage sends one ARQ block including 100 ARQ sub-blocks, the receiving stage may successfully receive the ARQ sub-blocks from #1 to #30 and from #61 to #90 and fail to receive the ARQ sub-blocks from #31 to #60 and from #91 to #100. To mark the reception success or failure of the ARQ sub-blocks from #1 to #30, the receiving stage sets the START_SSN field to '1', the Num_SSN field to '30', and the End field to '0'. To mark the reception success or failure of the ARQ sub-blocks from #61 to #90, the receiving stage sets the START_SSN field to '61', the Num_SSN field to '90', and the End field to '1'.

In this case, the transmitting stage recognizes that the ARQ sub-blocks from #31 to #60, of which the reception success or failure is not specified by the ARQ feedback information of the ARQ sub-blocks, are compromised. Accordingly, the transmitting stage can retransmit the ARQ sub-blocks from #31 to #60. The transmitting stage recognizes that the receiving stage does not yet receive the ARQ sub-blocks from #91 to #100. When recognizing the transmission failure of the ARQ sub-blocks from #91 to #100, the transmitting stage may retransmit the ARQ sub-blocks from #91 to #100.

As described above, the receiving stage adds the ARQ feedback information of the ARQ sub-blocks to the ARQ feedback information of the ARQ block using the ExT field and the SEN field. The receiving stage generates and sends the ARQ feedback information to the transmitting stage as shown in FIG. 3.

Figure 3:
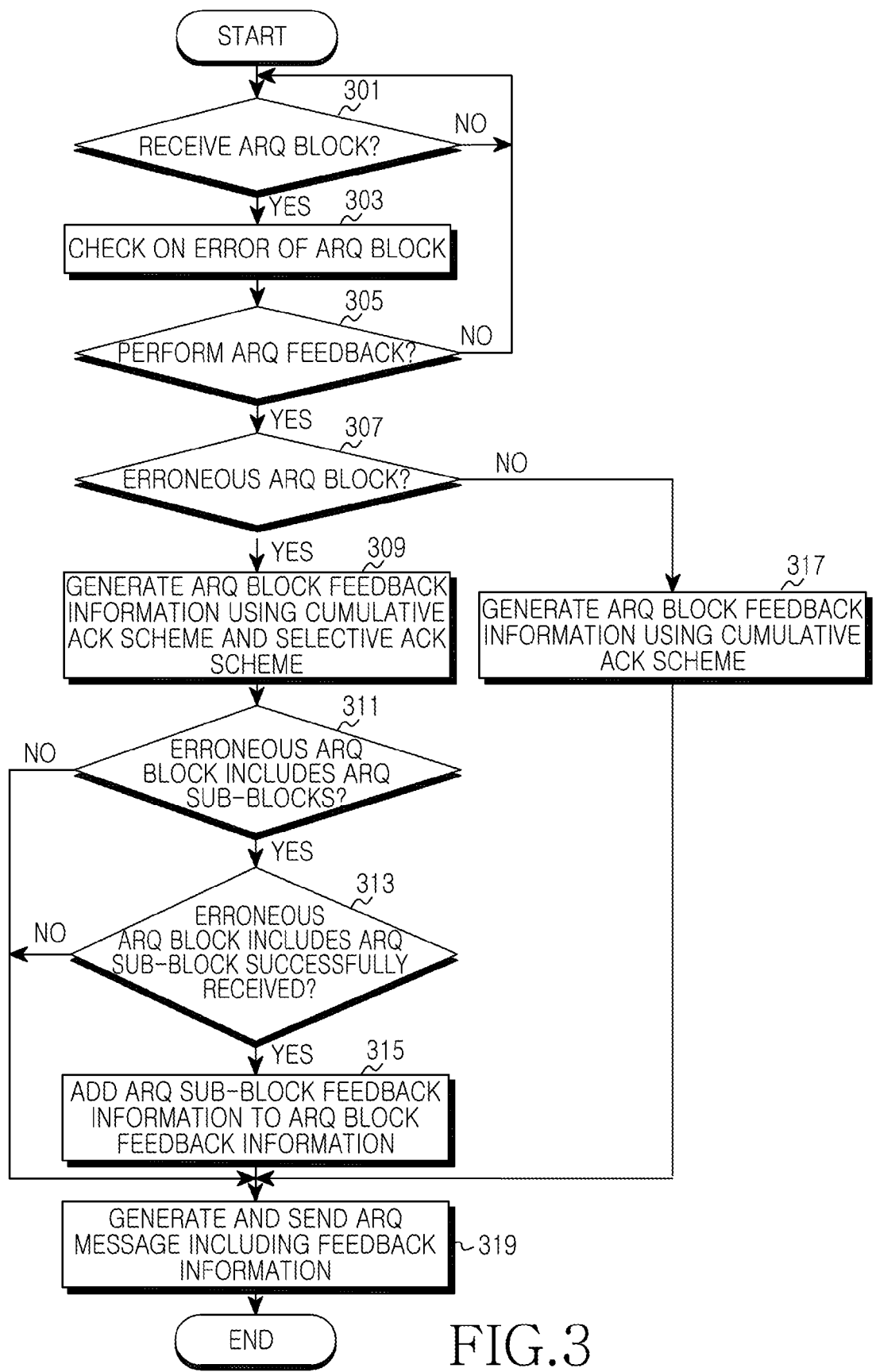
FIG. 3 illustrates a method for generating the ARQ feedback message at a receiving stage in a wireless communication system according to an exemplary embodiment of the present invention.

FIG. 3 illustrates a method for generating the ARQ feedback message at the receiving stage in the wireless communication system according to an exemplary embodiment of the present invention.

In step 301, the receiving stage determines whether an ARQ block is received from the transmitting stage. Upon receiving the ARQ block, the receiving stage determines whether the received ARQ block has errors in step 303. In step 305, the receiving stage determines whether to perform the ARQ feedback. To perform no ARQ feedback, the receiving stage returns to step 301 and determines whether another ARQ block is received from the transmitting stage. To perform the ARQ feedback, the receiving stage determines whether the ARQ blocks for the ARQ feedback include an erroneous ARQ block in step 307.

If it is determined in step 307 that there are no erroneous ARQ blocks, the receiving stage generates ARQ feedback information for the ARQ block using the cumulative ACK scheme in step 317. For example, when the ARQ blocks from #1 to #10 for the ARQ feedback have no errors, the receiving stage generates the ARQ feedback information including the FLAG1 field '0' and the SN field '10' as shown in Table 1, Table 2, Table 3, Table 4, or Table 5. After generating the ARQ feedback information, the receiving stage generates an ARQ feedback message including the generated ARQ feedback information and sends the ARQ feedback message to the transmitting stage in step 319.

In contrast, if it is determined in step 307 that there is an erroneous ARQ block, the receiving stage generates feedback information for the ARQ block using the cumulative ACK scheme and the selective ACK scheme in step 309. For example, the receiving stage sets the SN field to include the SN of the first erroneous ARQ block in Table 1, Table 2, Table 3, Table 4, or Table 5. The receiving stage generates the ARQ feedback information by forming the selective ACK map to indicate the error of the ARQ blocks, which is not indicated with the ARQ feedback information of the cumulative ACK scheme.

In step 311, the receiving stage determines whether any of the erroneous ARQ blocks include ARQ sub-blocks. If it is determined in step 311 that there is no ARQ block including ARQ sub-blocks, the receiving stage generates an ARQ feedback message including the ARQ feedback information generated for the ARQ block in step 309, and generates and sends the ARQ feedback message to the transmitting stage in step 319.

In contrast, if it is determined in step 311 that at least one ARQ block includes ARQ sub-blocks, the receiving stage determines whether any of the ARQ sub-blocks have been successfully received in step 313.

If it is determined in step 313 that none of the ARQ sub-blocks have been successfully received, the receiving stage recognizes that all of the ARQ sub-blocks constituting the ARQ block are compromised. Using only the NACK information for the ARQ block, the receiving stage can represent the NACK information for the ARQ sub-blocks. The receiving stage generates an ARQ feedback message including the ARQ feedback information generated for the ARQ block in step 309 and sends the ARQ feedback message to the transmitting stage in step 319.

In contrast, it is determined in step 313 that at least one ARQ sub-block has been successfully received, the receiving stage adds the feedback information of the ARQ sub-blocks to the feedback information generated in step 309 using the ExT field and the SEM field in step 315. For example, the receiving stage adds the feedback information of the ARQ sub-blocks to the feedback information of the ARQ block using the ExT field and the SEM field as shown in Table 1, Table 2, Table 3, Table 4, or Table 5. The receiving stage indicates the existence of the SEM field using the ExT field and indicates the ARQ block to carry the ARQ sub-block feedback information using the SEM field. The receiving stage generates the ARQ sub-block feedback information for the ARQ block including the SEM field bit set to '1' and adds the generated feedback information to the ARQ block feedback information.

After adding the ARQ sub-block feedback information to the ARQ block feedback information, the receiving stage generates an ARQ feedback message including the ARQ block feedback information with the ARQ sub-block feedback information added in step 315 and sends the ARQ feedback message to the transmitting stage in step 319. Finally, the receiving stage sends the ARQ feedback message to the transmitting stage.

A method of the transmitting stage for checking for the error in the ARQ block and the ARQ sub-blocks based on the ARQ feedback information is described below.

Figure 4:
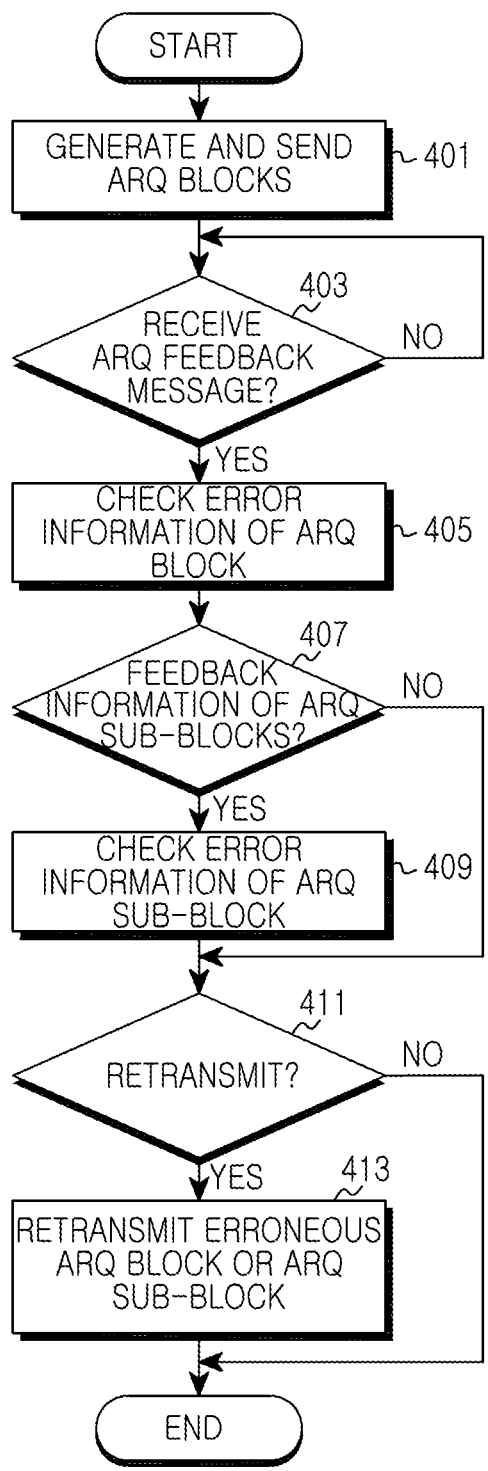
FIG. 4 illustrates a method for sending the ARQ block at a transmitting stage in a wireless communication system according to an exemplary embodiment of the present invention.

FIG. 4 illustrates a method for sending the ARQ block at the transmitting stage in the wireless communication system according to an exemplary embodiment of the present invention.

The transmitting stage generates ARQ blocks to provide the ARQ based communication service and sends the ARQ blocks to the receiving stage in step 401. For example, the transmitting stage generates the ARQ block according to the scheduling of the SDU fed from the upper layer. The transmitting stage can generate the MPDU with at least one ARQ block. For example, the transmitting stage generates the ARQ block by dividing one SDU fed from the upper layer or combining the plurality of the SDUs. The transmitting stage generates one MPDU with one ARQ block.

In step 403, the transmitting stage determines whether an ARQ feedback message is received from the receiving stage to which the ARQ blocks are sent. Upon receiving the ARQ feedback message, the transmitting stage checks for errors in the ARQ blocks sent to the receiving stage, based on the ARQ feedback information contained in the ARQ feedback message in step 405.

In step 407, the transmitting stage determines whether the ARQ feedback message includes the feedback information of the ARQ sub-blocks. For example, the transmitting stage examines whether the ARQ feedback message includes the feedback information of the ARQ sub-blocks, by taking into account the value of the ExT field of the ARQ feedback message. When the ExT field is '0', the transmitting stage recognizes that the ARQ feedback message does not include the feedback information of the ARQ sub-blocks. When the ExT field is '1', the transmitting stage recognizes that the ARQ feedback message includes the feedback information of the ARQ sub-blocks.

When the ARQ feedback message does not include the feedback information of the ARQ sub-blocks, the transmitting stage determines whether an ARQ block is retransmitted, according to the errors in the ARQ blocks, in step 411.

When the ARQ feedback message includes the feedback information of the ARQ sub-blocks, the transmitting stage checks for errors in the ARQ sub-blocks based on the SEM field and the selective ACK map 2 field of the ARQ feedback message in step 409. For example, based on the SEM field, the transmitting stage identifies the ARQ block including the ARQ sub-blocks and having errors in only some of the ARQ sub-blocks. Based on the bit value of the selective ACK map 2 field, the transmitting stage determines whether the ARQ block includes erroneous ARQ sub-blocks.

In step 411, the transmitting stage checks on the ARQ block and the ARQ sub-blocks to retransmit according to the error of the ARQ blocks inspected in step 405 and the error of the ARQ sub-blocks inspected in step 409. When there are no ARQ block and ARQ sub-blocks to retransmit, the process is completed, and the transmitting stage sends a new ARQ block to the receiving stage. When ARQ blocks and ARQ sub-blocks should be retransmitted, the transmitting stage retransmits the appropriate ARQ block and the ARQ sub-blocks to the receiving stage in step 413.

A construction of the transmitting stage for transmitting the ARQ block or the ARQ sub-blocks is described below with respect to FIG. 5.

Figure 5:
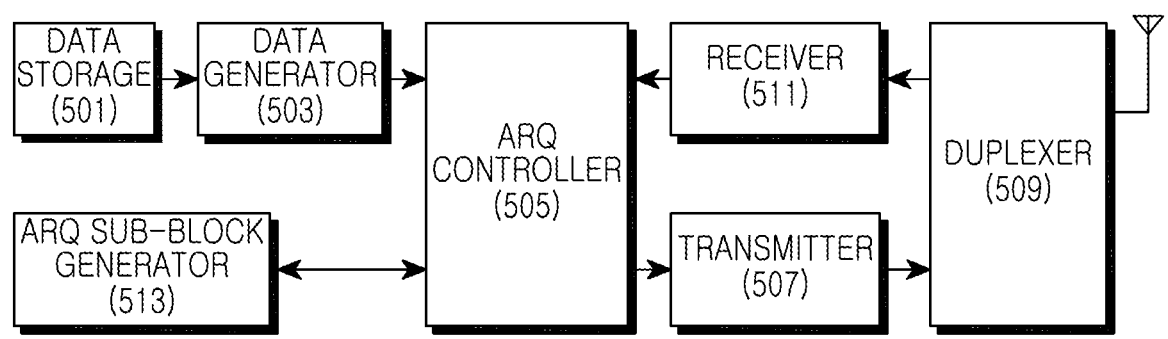
FIG. 5 illustrates the transmitting stage in a wireless communication system according to an exemplary embodiment of the present invention.

FIG. 5 is a block diagram of the transmitting stage in the wireless communication system according to an exemplary embodiment of the present invention.

Referring to FIG. 5, the transmitting stage includes a data storage 501, a data generator 503, an ARQ controller 505, a transmitter 507, a duplexer 509, a receiver 511, and an ARQ sub-block generator 513. The transmitting stage may include additional units. Similarly, the functionality of two or more of the above units may be integrated into a single component.

The data storage 501 stores data generated in the upper application program. For example, the data storage 501 is constructed as a data queue. The data generator 503 splits or combines the data stored to the data storage 501 into the size to transmit according to the scheduling information.

The ARQ controller 505 generates ARQ blocks for the ARQ of the data fed from the data generator 503, and assigns SNs to the ARQ blocks. For example, the ARQ controller 505 generates the ARQ blocks by dividing the SDU provided from the upper layer into a certain data size. The ARQ controller 505 generates the MPDU with at least one ARQ block and assigns ARQ SNs to the ARQ blocks according to the division order of the SDU. For example, the ARQ controller 505 generates the ARQ blocks by dividing one SDU provided from the upper layer or combining the plurality of the SDUs. In so doing, the ARQ controller 505 generates one MPDU with one ARQ block and sequentially assigns the ARQ SNs.

Based on the ARQ feedback message received from the receiving stage, the ARQ controller 505 checks for errors in the ARQ blocks and the ARQ sub-blocks sent to the receiving stage. For example, the ARQ controller 505 checks for errors in the ARQ blocks based on the ARQ feedback message, and determines whether the ARQ feedback message includes the feedback message of the ARQ sub-blocks based on the ExT field value. When the ExT field is '0', the ARQ controller 505 recognizes that the ARQ feedback message does not include the feedback information of the ARQ sub-blocks. When the ExT field is '1', the ARQ controller 505 recognizes that the ARQ feedback message includes the feedback information of the ARQ sub-blocks. When the ExT field is '1', the ARQ controller 505 checks for errors in the ARQ sub-blocks based on the SEM field and the selective ACK map 2 field of the ARQ feedback message. Based on the SEM field, the ARQ controller 505 identifies the ARQ blocks in which some of the ARQ sub-blocks have errors. Based on the bit value of the selective ACK map 2 field, the ARQ controller 505 checks for errors in the ARQ sub-blocks of the ARQ block.

When the ARQ block transmitted or retransmitted to the receiving stage is compromised, the ARQ controller 505 retransmits the compromised ARQ block. For example, the ARQ controller 505 determines whether to divide the retransmit ARQ block into ARQ sub-blocks. When the ARQ controller determines that the ARQ block should be divided, the ARQ controller 505 controls the ARQ sub-block generator 513 to segment the compromised ARQ block into the ARQ sub-blocks. When the ARQ controller determines that the ARQ block should not be divided, the ARQ controller 505 retransmits the original ARQ block of the compromised ARQ block.

The ARQ sub-block generator 513 segments the ARQ block to retransmit due to the error, into two ARQ sub-blocks under the control of the ARQ controller 505. The ARQ sub-block generator 513 can segment the ARQ block in the fixed or variable size.

The transmitter 507 includes a channel encoding block, a modulation block, and a Radio Frequency (RF) processing block. The transmitter 507 converts at least one of the ARQ block and the ARQ sub-blocks fed from the ARQ controller 505 to an RF signal and sends the RF signal to the receiving stage via the duplexer 509. For example, the channel encoding block includes a channel encoder, an interleaver, a modulator, and so on. In an Orthogonal Frequency Division Multiplexing (OFDM) system, the modulation block includes an Inverse Fast Fourier Transform (IFFT) operator. In a Code Division Multiple Access (CDMA) system, the modulation block includes a code spreading modulator. The RF processing block converts the baseband signal output from the modulation block to an RF signal and outputs the RF signal over an antenna.

The duplexer 509 sends the transmit signal output from the transmitter 507 over an antenna, and provides a receive signal from the antenna to the receiver 511 according to the duplexing scheme.

The receiver 511 includes an RF processing block, a demodulation block, a channel decoding block, and the like. The receiver 511 demodulates an RF signal fed from the duplexer 509 to the baseband signal. For example, the RF processing block converts the RF signal output from the duplexer 509 to the baseband signal. The demodulation block includes an FFT operator for extracting data from subcarriers of the signal output from the RF processing block. The channel decoding block includes a demodulator, a deinterleaver, and a channel decoder.

As constructed above, the ARQ controller 505 can function as the ARQ sub-block generator 513. The ARQ controller 505 and the ARQ sub-block generator 513 are described herein separately provided to distinguish their functions. In an actual implementation, the ARQ controller 505 can process all or part of the functions of the ARQ sub-block generator 513. A construction of the receiving stage for generating the ARQ feedback message is described below with respect to FIG. 6.

Figure 6:
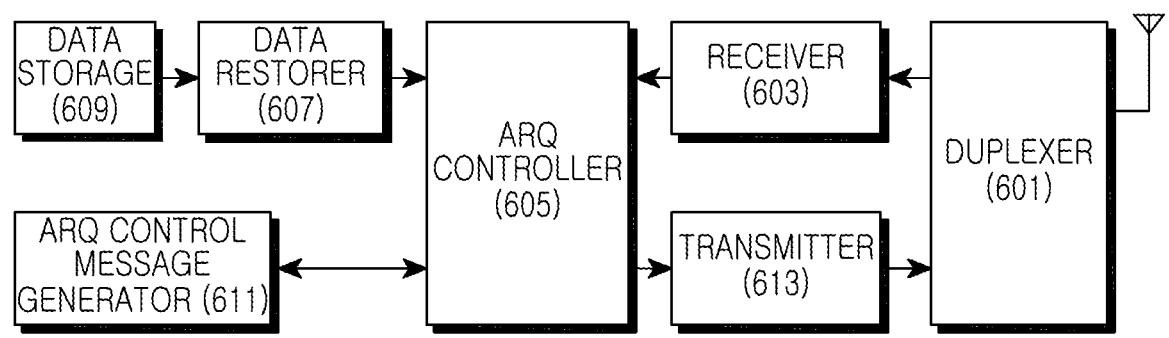
FIG. 6 illustrates the receiving stage in a wireless communication system according to an exemplary embodiment of the present invention.

FIG. 6 is a block diagram of the receiving stage in a wireless communication system according to an exemplary embodiment of the present invention.

Referring to FIG. 6, the receiving stage includes a duplexer 601, a receiver 603, an ARQ controller 605, a data restorer 607, a data storage 609, an ARQ control message generator 611, and a transmitter 613.

The duplexer 601 sends a transmit signal output from the transmitter 613 over an antenna, and provides a receive signal from the antenna to the receiver 603 according to the duplexing scheme. The receiver 603 includes an RF processing block, a demodulation block, a channel decoding block, and the like. The receiver 603 demodulates an RF signal fed from the duplexer 601 to the baseband signal. For example, the RF processing block converts the RF signal output from the duplexer 509 to the baseband signal. The demodulation block includes an FFT operator for extracting data from subcarriers of the signal output from the RF processing block. The channel decoding block includes a demodulator, a deinterleaver, and a channel decoder.

The ARQ controller 605 confirms the SNs of the ARQ block and the ARQ sub-blocks output from the receiver 603, and checks for errors in the ARQ block and the ARQ sub-blocks. The ARQ controller 605 checks for an ARQ feedback time and controls the ARQ control message generator 611 to generate the ARQ feedback message when the ARQ feedback time comes.

The data restorer 607 restores the original data of the data segmented or combined by the data generator 503 of the transmitting stage, using the errorless ARQ successfully received at the ARQ controller 605. The data storage 609 stores the data restored by the data restorer 607 and provides the data to the upper application program. For example, the data storage 609 may be constructed as a data queue.

The ARQ control message generator 611 generates the ARQ feedback message to send to the transmitting stage under the control of the ARQ controller 605. For example, when the ARQ block received from the transmitting stage is compromised, the ARQ control message generator 611 generates the ARQ feedback information for the ARQ block using the cumulative ACK scheme and the selective ACK scheme. Using the ExT field and the SEM field, the ARQ control message generator 611 adds the ARQ sub-block feedback information to the ARQ block feedback information.

The ARQ control message generator 611 adds the ARQ sub-block feedback information to the ARQ block feedback information using the ExT field and the SEM field as shown in Table 1, Table 2, Table 3, Table 4, or Table 5. The ARQ control message generator 611 indicates the existence of the SEM field using the ExT field, and indicates the ARQ block to carry the ARQ sub-block feedback information using the SEM field. The ARQ control message generator 611 generates the ARQ sub-block feedback information of the ARQ block with the SEM field bit set to '1' and adds the generated feedback information to the ARQ block feedback information.

When the compromised ARQ blocks include ARQ blocks having errors only in some ARQ sub-blocks, the ARQ control message generator 611 adds the ARQ sub-block feedback information to the ARQ block feedback information. The ARQ controller 605 determines whether the compromised ARQ blocks include ARQ blocks having ARQ sub-blocks. The ARQ controller 605 also determines whether any of the compromised ARQ blocks include at least one successfully received ARQ sub-block.

The transmitter 613 includes a channel encoding block, a modulation block, and an RF processing block. The transmitter 613 converts the ARQ feedback message output from the ARQ controller 605 to an RF signal and sends the RF signal to the transmitting stage via the duplexer 601. For example, the channel encoding block includes a channel encoder, an interleaver, a modulator, and so on. In the OFDM system, the modulation block includes an IFFT operator. In the CDMA system, the modulation block includes a code spreading modulator. The RF processing block converts the baseband signal output from the modulation block to an RF signal and outputs the RF signal over an antenna.

As constructed above, the ARQ controller 605 can function as the ARQ control message generator 611. The ARQ controller 605 and the ARQ control message generator 611 are described herein and separately provided to distinguish their functions. In an actual implementation, the ARQ controller 605 can process all or part of the functions of the ARQ control message generator 611.

As set forth above, the receiving stage of the wireless communication system generates the ARQ feedback message by adding the ARQ sub-block feedback information to the ARQ block feedback information. Therefore, the ARQ feedback for the ARQ block and the ARQ sub-blocks can be accomplished, and overhead on the ARQ feedback can be reduced.

In addition, the transmitting stage obtains the feedback information of the ARQ block and the ARQ sub-blocks from the single ARQ feedback message received from the receiving stage. Therefore, the time delay taken to confirm the feedback information of the ARQ sub-blocks can be shortened.

Although the present disclosure has been described with an exemplary embodiment, various changes and modifications may be suggested to one skilled in the art. It is intended that the present disclosure encompass such changes and modifications as fall within the scope of the appended claims and their equivalents.

What is claimed is:

1. A method for transmitting an Automatic Repeat reQuest (ARQ) feedback message at an ARQ block receiver in a wireless communication system, the method comprising:
   receiving a plurality of ARQ blocks; and
   transmitting the ARQ feedback message including first information, second information and third information to a ARQ block transmitter,
   wherein the first information indicates that the received ARQ block is one of an ACKed ARQ block and a NACKed ARQ block,
   wherein the second information indicates that the NACKed ARQ block is one of a partially NACKed ARQ block and a completely NACKed ARQ block, and
   wherein the third information indicates whether at least one ARQ sub-block of the partially NACKed ARQ block is received correctly.

2. The method of claim 1, wherein the third information indicates
   a sequence number of a first correctly received ARQ sub-block and a number of correctly received consecutive ARQ sub-blocks from the first correctly received ARQ sub-block.

3. The method of claim 1, wherein the third information further indicates
   at least one of a bitmap indicating errors in the ARQ sub-blocks, existence of the bitmap, a format of the second information, a sequence number of a last successfully received ARQ sub-block or a first correctly ARQ sub-block according to the format of the second information, existence of the additional second information, a sequence number information of the ARQ sub-blocks, a sequence bitmap information indicating ACK/Negative ACK (NACK) information of a sequence group, and information indicating a length of the sequence group.

4. The method of claim 1, wherein the ARQ feedback message further includes fourth information indicating at least one of an identifier of a connection or flow with the ARQ applied, a format of the first information, and a sequence number of a last successfully received ARQ block or a first erroneous ARQ block according to the format of the first information.

5. The method of claim 4, wherein the format of the first information indicates at least one of a cumulative ACKnowledge (ACK) scheme and a selective ACK scheme.

6. The method of claim 1, wherein the ACKed ARQ block indicates that the ARQ block is received correctly.

7. The method of claim 1, wherein the partially NACKed ARQ block indicates that at least one ARQ sub-block in the ARQ block is received correctly.

8. The method of claim 1, wherein the completely NACKed ARQ block indicates that no ARQ sub-blocks in the ARQ block are received correctly.

9. The method of claim 1, wherein the ARQ feedback message further includes fifth information indicating existence of ARQ sub-block ACK/NACK indication.

10. The method of claim 1, wherein the ARQ feedback message further includes fifth information indicating existence of at least one of the second information and the third information.

11. An Automatic Repeat reQuest (ARQ) receiver in a wireless communication system, the ARQ receiver comprising:
    a receiver for receiving a plurality of ARQ blocks; and
    a transmitter for transmitting an ARQ feedback message including first information, second information, and third information to a ARQ block transmitter,
    wherein the first information indicates that the received ARQ block is one of an ACKed ARQ block and a NACKed ARQ block,
    wherein the second information indicates that the NACKed ARQ block is one of a partially NACKed ARQ block and a completely NACKed ARQ block, and
    wherein the third information indicates whether at least one ARQ sub-block of the partially NACKed ARQ block is received correctly.

12. The ARQ receiver of claim 11, wherein the third information indicates a sequence number of a first correctly received ARQ sub-block and a number of correctly received consecutive ARQ sub-blocks from the first correctly received ARQ sub-block.

13. The ARQ receiver of claim 12, wherein the third information further indicates at least one of a bitmap indicating errors in the ARQ sub-blocks, existence of the bitmap, a format of the second information, a sequence number of a last successfully received ARQ sub-block or a first correctly ARQ sub-block according to the format of the second information, existence of the additional second information, a sequence number information of the ARQ sub-blocks, sequence bitmap information indicating ACK/Negative ACK (NACK) information of a sequence group, and information indicating a length of the sequence group.

14. The ARQ receiver of claim 11, wherein the ARQ feedback message further includes fourth information indicating at least one of an identifier of a connection or flow with the ARQ applied, a format of the first information, a sequence number of a last successfully received ARQ block, and a first erroneous ARQ block according to the format of the first information.

15. The ARQ receiver of claim 14, wherein the format of the first information indicates at least one of a cumulative ACKnowledge (ACK) scheme and a selective ACK scheme.

16. The ARQ receiver of claim 11, wherein the ACKed ARQ block indicates that the ARQ block is received correctly.

17. The ARQ receiver of claim 11, wherein the partially NACKed ARQ block indicates that at least one ARQ sub-block in the ARQ block is received correctly.

18. The ARQ receiver of claim 11, wherein the completely NACKed ARQ block indicates that no ARQ sub-blocks in the ARQ block are received correctly.

19. The ARQ receiver of claim 11, wherein the ARQ feedback message further includes fifth information indicating existence of an ARQ sub-block ACK/NACK indication.

20. The ARQ receiver of claim 11, wherein the ARQ feedback message further includes a fifth information indicating existence of at least one of the second information and the third information.

\* \* \* \* \*